United States Patent [19]

Ballard et al.

[11] 4,172,760

[45] Oct. 30, 1979

[54] NEUTRON TRANSMISSION TESTING APPARATUS AND METHOD

[75] Inventors: Charles H. Ballard, Morgan Hill; Howard D. Kosanke, Livermore, both of Calif.

[73] Assignee: General Electric Company, San Jose, Calif.

[21] Appl. No.: 747,824

[22] Filed: Dec. 6, 1976

[51] Int. Cl.² ............................................. G21C 17/00
[52] U.S. Cl. .................................................. 176/19 R
[58] Field of Search .................... 176/19; 250/390-392

[56] References Cited

U.S. PATENT DOCUMENTS

| | | | |
|---|---|---|---|
| 2,936,274 | 5/1960 | Dessauer | 176/19 R |
| 3,050,624 | 8/1962 | Janner | 176/19 |
| 3,222,521 | 12/1965 | Einfeld | 250/391 |
| 3,496,357 | 2/1970 | Weinzierl et al. | 250/390 |
| 3,499,151 | 5/1970 | Mayer | 250/390 |
| 3,636,353 | 11/1972 | Untermyer | 176/19 R |
| 3,755,675 | 8/1973 | Stepan et al. | 250/391 |
| 4,036,686 | 7/1977 | Weilbacher et al. | 176/19 R |

FOREIGN PATENT DOCUMENTS

50-29119  4/1975  Japan ..................................... 176/19 R

Primary Examiner—Samuel W. Engle
Assistant Examiner—S. A. Cangialosi
Attorney, Agent, or Firm—Ivor J. James, Jr.; Samuel E. Turner; Sam E. Laub

[57] ABSTRACT

Apparatus for remotely testing radioactive components, for example, the components of a nuclear reactor, by determining and recording the neutron transmission characteristics of the component.

7 Claims, 9 Drawing Figures

NEUTRON TRANSMISSION TESTING APPARATUS AND METHOD

BACKGROUND

In known types of nuclear power reactors, for example as used in the Dresden Nuclear Power Station near Chicago, Ill., the reactor core comprises a plurality of spaced fuel assemblies arranged in an array capable of self-sustained nuclear fission reaction. The core is contained in a pressure vessel wherein it is submmerged in a working fluid, such as light water, which serves both as coolant and as a neutron moderator. Each fuel assembly comprises a tubular flow channel, typically of approximately square cross section, surrounding an array of elongated, cladded fuel elements or rods containing suitable fuel material, such as uranium or plutonium oxide, supported between upper and lower tie plates. The fuel assemblies are supported in spaced array in the pressure vessel between an upper core grid and a lower core support plate. The lower tie plate of each fuel assembly is formed with a nose piece which fits in a socket in the core support plate for communication with a pressurized coolant supply chamber. The nose piece is formed with openings through which the pressurized coolant flows upward through the fuel assembly flow channels to remove heat from the fuel elements. A typical fuel assembly of this type is shown, for example, by D. A. Venier et al. in U.S. Pat. No. 3,654,077. An example of a fuel element or rod is shown in U.S. Pat. No. 3,378,458.

A plurality of control rods, containing neutron absorbing material, are selectively insertable in the spaces or gaps among the fuel assemblies to control the reactivity of the core. In a known core arrangement, such as shown for example in U.S. Pat. No. 3,020,888, the control rod blades have a cross or cruciform trasversel cross section shape whereby the "wings" of the blades of each control rod are insertable in the spaces between an adjacent four fuel assemblies. Suitable mechanisms are provided, as shown in the above-mentioned U.S. Pat. No. 3,020,888, to selectively move the control rods into and out of the core whereby the neutron population and hence the core power level can be controlled by the non-fission capture of neutrons by the neutron absorbing material in the control rods. Suitable such neutron absorbing materials, including commonly used boron, are set forth in the above-mentioned U.S. Pat. No. 3,020,888.

During initial operation of the first core of a reactor, temporary, removable control curtains may be used to augment the moveable control rods. Such curtains may be formed of a boron stainless steel alloy and be suspended from the upper core support grid in the water gaps opposite the control blade tips.

Additional information on nuclear power reactors may be found, for example, in "Nuclear Power Engineering," M. M. El-Wakil, McGraw-Hill Book Company, Inc., 1962.

While the various reactor components are thoroughly factory tested before being placed in the reactor, there is a continuing need for in-service inspection equipment which can rapidly and conveniently verify the integrity of or detect any anomalies in such components at the reactor site, particularly after such components have been subjected to reactor service and have, therefore, become radioactive. Such radioactive condition of used components requires remotely operable equipment which can scan such components under water to protect the test equipment operators from radiation. Furthermore, known component testing techniques using photographic film, such as X-ray techniques, are not useful for radioactive components because the film is exposed by the radiation therefrom.

It is known that neutrons can be detected in the presence of radiation from radioactive components. It is also known that the transmission of neutrons through a component is a function of the neutron absorbing properties of the component. Therefore, it is an object of the invention to verify the quality of or detecting anomalies in radioactive components by comparing the neutron transmission characteristics thereof with the neutron transmission characteristics of a similar component of known quality, for example, with a factory tested and verified standard component.

Another object is to determine the neutron transmission characteristics of a component.

Another object is to remotely scan a radioactive component submerged in a body of water for neutron transmission therethrough along its length.

Another object of the invention is to provide test equipment including a neutron source and neutron detectors for directing neutrons into and detecting the neutron transmission through a selected dimension of a component.

SUMMARY

These and other objects of the invention are achieved by providing a small, high intensity neutron source removably contained in a shielded enclosure having an opening along one side to direct neutrons into an adjacent component under test. A second shielded enclosure is located on the other side of the component under test with an apertured neutron collimating plate adjacent the component. Neutron detectors are positioned behind the apertures of the collimating plate to detect the neutrons which are transmitted through the transverse dimension of the component.

Means are provided to move the testing device along the component (or vice versa) and the signals from the neutron detectors are recorded (for example, on a strip chart) to provide a profile of the neutron transmission through the component along its length. This neutron transmission profile can then be compared to a neutron transmission profile which is similarly obtained from a standard component of known quality.

DRAWING

The invention is described in greater detail hereinafter with reference to the accompanying drawing wherein.

DESCRIPTION

While the invention is useful for a comparative testing of a variety of components, for example, the control rods, control curtains, fuel rods, upper core support grid, etc. of a nuclear reactor, the invention will be described herein by way of detailed example primarily in connection with the remote testing of irradiated (used) and therefore radioactive control rods.

Figure 1:
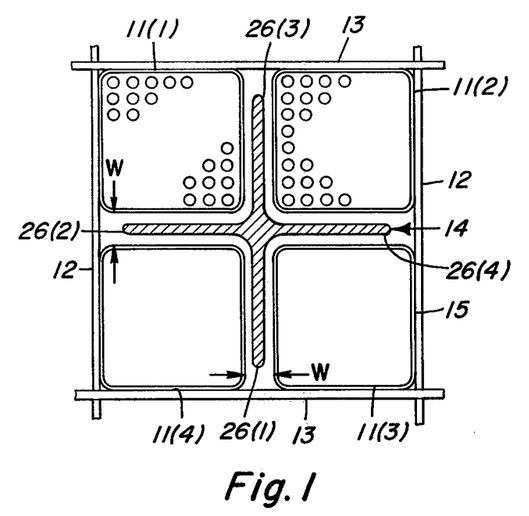
FIG. 1 is a plan view of a fuel assembly and control cell of a nuclear reactor core.

Shown in plan view in FIG. 1 is a four-assembly cell of a typical nuclear reactor core. Four fuel assemblies 11(1)–11(4) are laterally supported at their upper ends in an opening in an upper core support grid formed by intersecting and interlocking beams 12 and 13. Insertable in the water gaps W between the fuel assemblies in a cruciform shaped control rod 14.

Figure 2A:
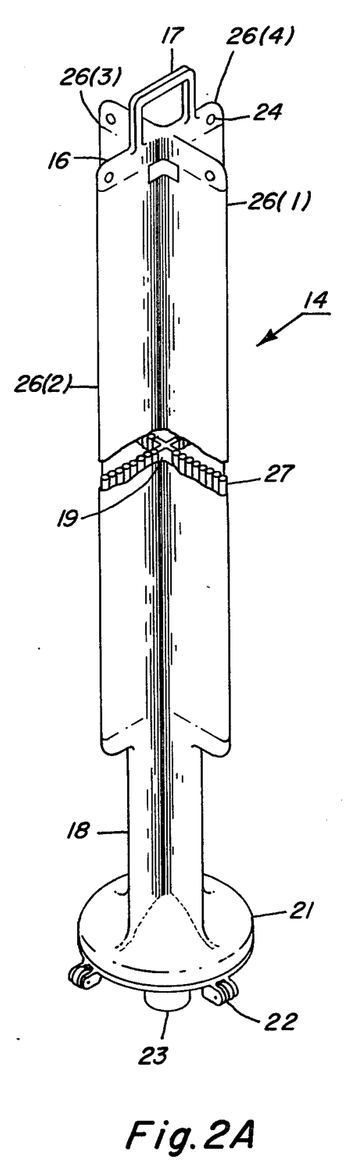
FIG. 2A is a perspective view of a control rod.

A perspective view of a control rod 14 is shown in FIG. 2A. The control rod 14 is formed of an upper casting 16, formed with a handle 17, connected to a lower casting 18 by a cruciform center post 19. The lower casting 18 is formed with a velocity limiter 21, guide rollers 22 and a coupling socket 23 for attachment to a suitable control rod drive mechanism as shown, for example, in the previously mentioned U.S. Pat. No. 3,020,888. The upper casting is also fitted with guide rollers 24 by which the control rod 14 is laterally supported between the fuel assemblies.

Figure 2B:
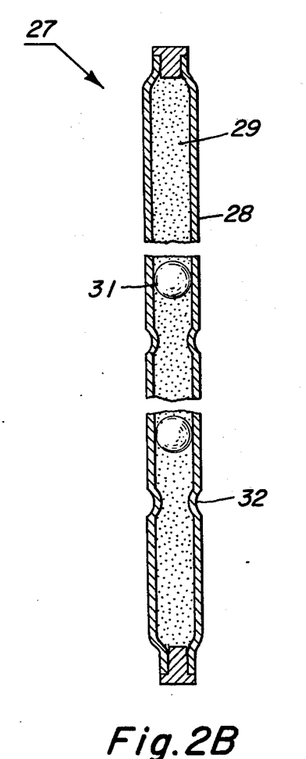
FIG. 2B is a longitudinal section view of an absorber rod used in the control rod of FIG. 2A.

Sheaths having a U-shape are attached to the center post 19 and to the upper and lower casting 16 and 18 to form the four wings 26(1)–26(4) of the control rod. Contained within each of the wings 26(1)–26(4) is a plurality of neutron absorber rods 27. A typical absorber rod 27, as shown in FIG. 2B, is formed of a sealed tube 28 containing neutron absorber material such as in the form of boron carbide ($B_4C$) powder 29. The column of powder 29 is segmented by a series of spaced balls 31 which are restricted in movement by spherical crimps 32 in the walls of tube 28. This arrangement aids in preventing voids in the column of powder 29 and prevents loss of all of the powder from the rod in the event of a crack in a portion thereof.

Figure 3:
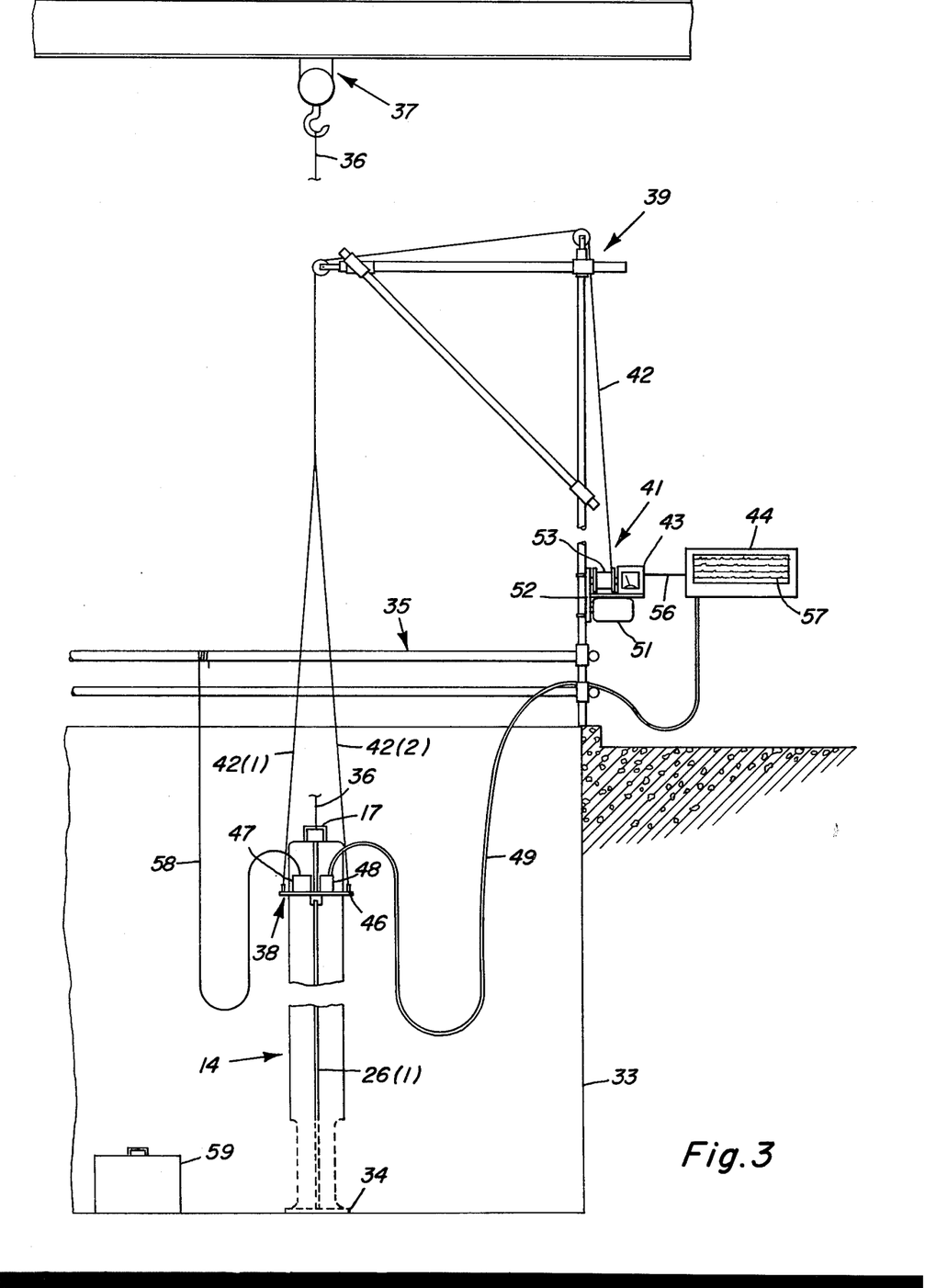
FIG. 3 is an elevation and schematic view of a system according to the invention.

FIG. 3 is an elevation and schematic view (not to scale) of a system according to the invention for testing irradiated radioactive control rods. Depicted in FIG. 3 is a water-filled refueling pool 33, surrounded by a railing 55, which is available in a nuclear reactor plant to receive, and provide radiation shielding from, component such as fuel assemblies, control rods and the like that are removed from the reactor.

The control rod 14 to be tested may be supported at the bottom of the pool 33 by a suitable fixture 34 or it may be suspended in the pool by a cable 36 connected between the control rod handle 17 and an overhead crane 37.

The test apparatus includes a carriage 38 for movement along the control rod 14, a boom 39, a variable speed winch arrangement 41 for moving carriage 38 by means of a cable 42, a travel indicator and encoder 43 and a strip chart recorder 44.

The carriage 38 includes a base plate 46 fitted with spring loaded rollers or wheels (not shown on FIG. 3) for close movement along the control rod 14. The base plate 46 carries a source enclosure 47 along one side and a detector enclosure 48 along the other side of the wing 26(1) of the control rod 14. The source enclosure 47 is formed of neutron shielding material and it removably contains a strong source of neutrons. The enclosure 47 is open or apertured on the side adjacent the control rod wing 26(1) whereby neutrons are directed into this wing and into the absorber rods 27 contained therein.

The detector enclosure 48 is likewise formed of neutron shielding material to reduce entrance of scattered neutrons from the source in enclosure 47 and stray neutrons from other sources (such as from irradiated fuel assemblies, not shown, that might be in the pool). The side of the enclosure 48 adjacent the control rod wing 26(1) is formed with neutron collimating apertures (slots or holes) and positioned behind these apertures are neutron detectors. Thus the neutron detectors detect the neutrons that pass from the source in source enclosure 47 through the control rod wing 26(1). The signals from the neutron detectors, which are transmitted through a cable 49 to the chart recorder 44 are proportional to the neutron transmission characteristics of the control rod wing 26(1). The carriage 38 is described in greater detail hereinafter.

The winch arrangement 41 includes a reversible, speed controlled electric motor 51 and a gear box 52 driving a winch drum 53 upon which the cable 42 is let out or taken up to lower or raise the carriage 38 along the control rod 14. Connected to detect rotation of the shaft of the winch drum 53 is the travel indicator and encoder 43. The indicator-encoder 43 includes a muti-turn potentiometer connected in series with a voltage source and a panel meter 54 in well-known manner. Thus the panel meter 54 can be calibrated directly in units of distance traveled by the carriage 38 along the control rod 14. The indicator-encoder 43 also includes a well-known analog-to-digital convertor or digital encoder which converts rotation of the shaft of winch drum 53 to a digital position-indicating signal. This position signal is supplied over a lead 56 to chart recorder 44 to record the positions of the carriage 38 along the control rod 14 on a recording chart 57 of the chart recorder 44.

As mentioned hereinbefore, the signals from the neutron detectors in the detector enclosure 48 of carriage are transmitted through a cable 49 to chart recorder 44 as the carriage 38 is moved along the control rod 14 to scan the neutron transmission characteristics of the wing 26(1) thereof. The well-known chart recorder 44 includes suitable signal processing circuitry and a recording channel for each of the neutron detectors as well as a channel for the position indicating signal from indicator-encoder 43. (Alternatively, the position signal may be superimposed on one or more of the neutron detector signal traces.) Thus as the carriage 38 is moved along the control rod 14, traces of the neutron detector signals and the position signal are recorded on the strip chart 57. This chart record then can be compared to a similarly prepared chart record of a standard control rod of known quality to thereby confirm the quality of or detect any anomalies in the control rod wing 26(1). The other wings 26(2)–26(4) of the control rod 14 are similarly tested and recorded by repositioning of the carriage 38 on the control rod 14.

Also shown in FIG. 3 is a cable 58 and a shielded storage cask 59. The cable 58 is attached to the neutron source in the source enclosure 47. The cable 58 is used to remotely insert the neutron source into and to remove it from the enclosure 47 as is described in more detail hereinafter. When the test equipment is not in use, the neutron source is deposited for storage or transportation in the cask 59.

Figure 4A:
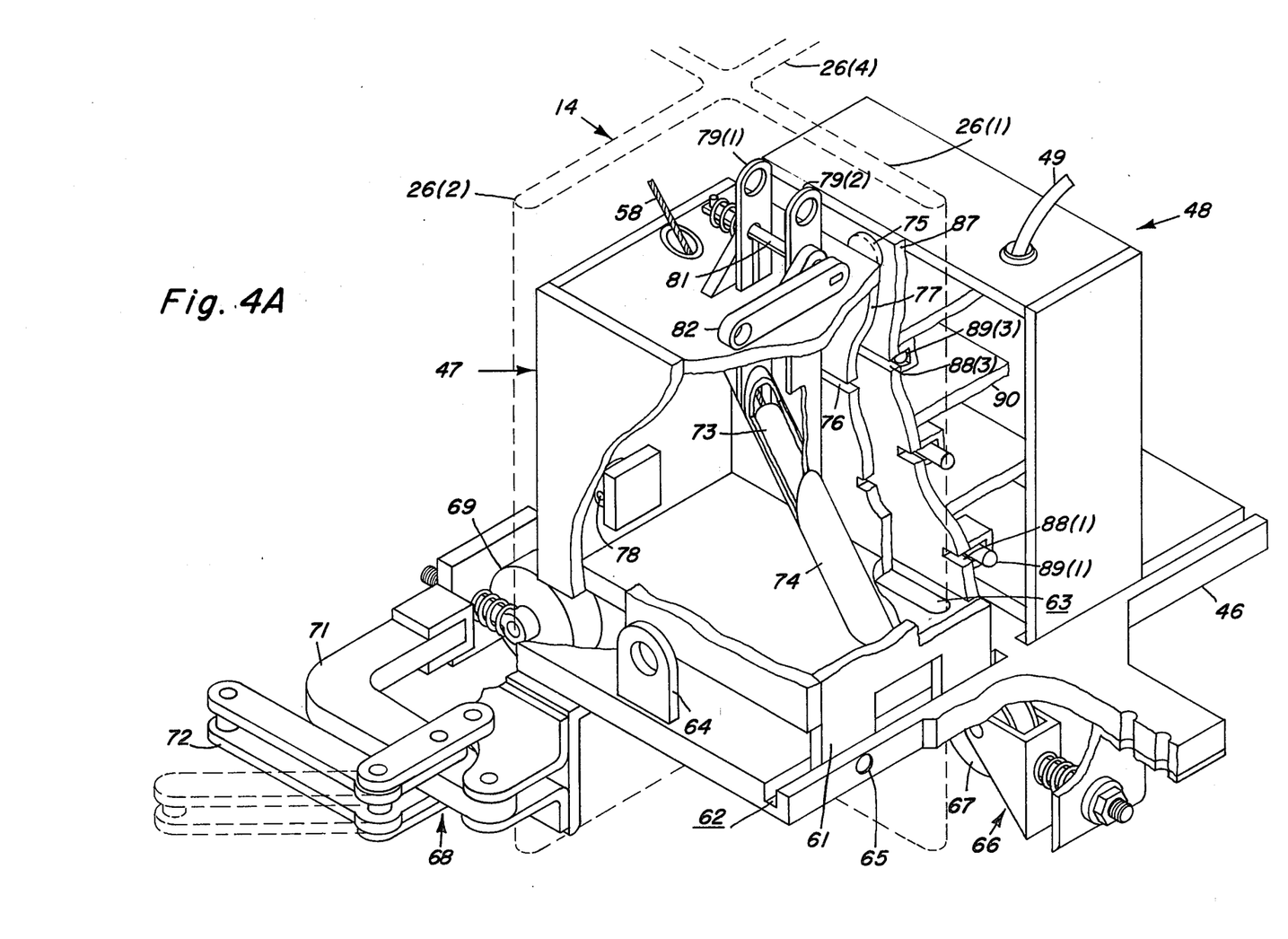
FIG. 4A is a perspective view, partly in section, of a test carriage of the invention.
Figures 4B, 4C, 5:
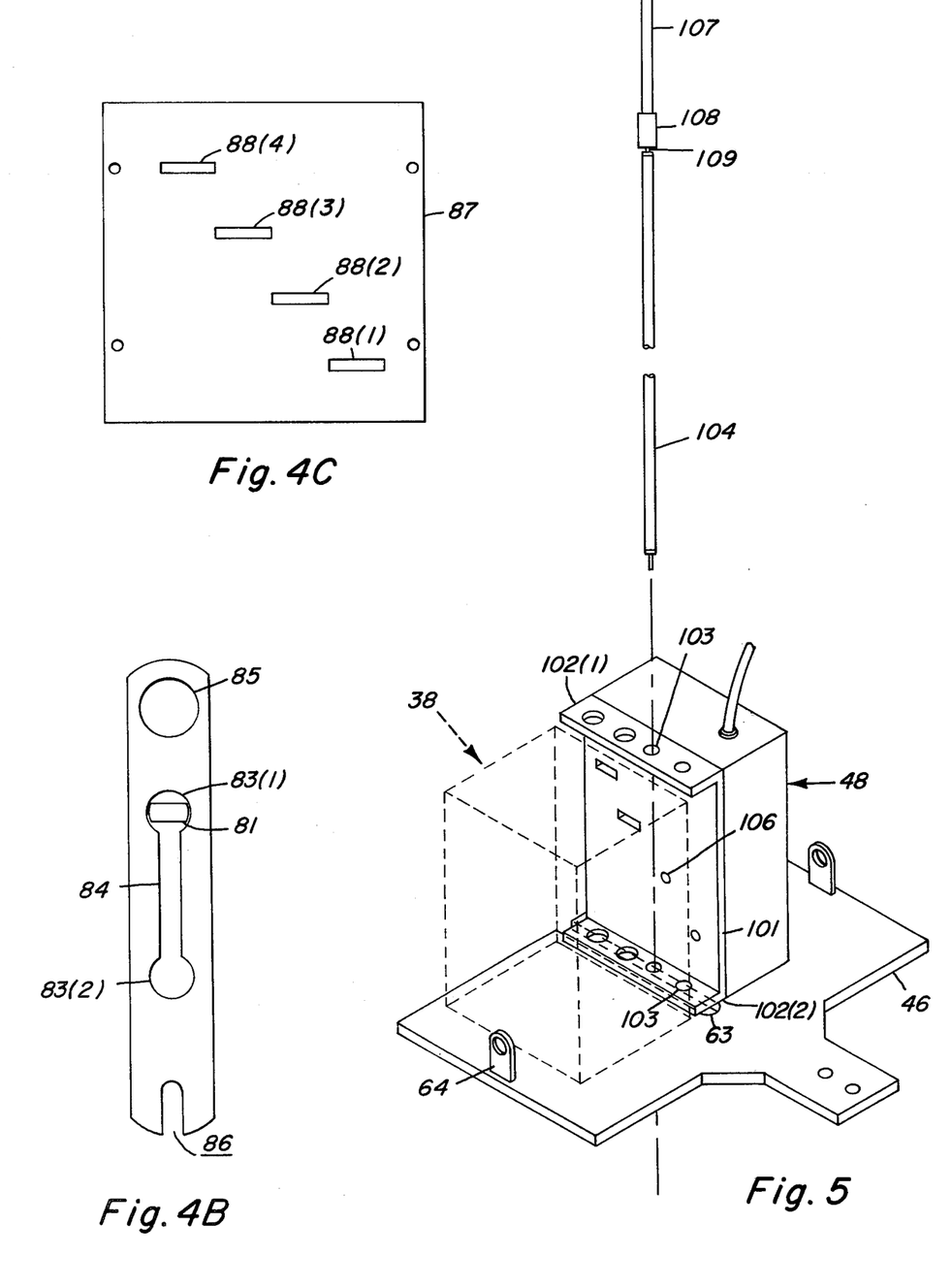
FIG. 4B is an elevation view of a keeper member of the carriage of FIG. 4A.
FIG. 4C is an elevation view of a face plate of the carriage of FIG. 4A.
FIG. 5 is a partial perspective view illustrating a modification of the test carriage of the invention.

Details of the carriage 38 are shown in FIGS. 4A, 4B and 4C. The source enclosure 47 and detector enclosure 48 are essentially rectangular boxes having downward extended side plates which fit into grooves in the base plate 46. For example, a side plate 61 of source enclosure 47 fits into a groove 62 in which it is secured by a screw 65. This provides adjustment of the enclosures toward and away from the control rod wing 26(1) which is received in a U-shaped slot 63 formed with an open end (hidden in FIG. 4A).

The enclosures 47 and 48 are formed of relatively thick material having a high neutron capture cross section, such as boron containing aluminum or the like, to reduce neutron leakage from the source and to shield the neutron detectors from stray neutrons.

The base plate 46 is fitted with a pair lifting eyes such as eye 64 (the similar eye at the opposite end being hidden in FIG. 4A), for attachment to the yoke ends 42(1) and 42(2), respectively, of the cable 42 (FIG. 3).

The carriage 38 is fitted to and restrained for movement along the control rod 14 by a system of three spring loaded wheels. This includes a wheel arrangement 66 attached to the center of one side of the base 46, the arrangement 66 having a shaped wheel 67 which rides upon the outer edge of the wing 26(1) of the control rod under test, and a pair of wheel arrangements, which are indicated as 68, mounted at the opposite corners of the other side of the base 46.

The arrangement 68 includes a wheel 69 adapted to ride against the "back" side of the control rod wing 26(2). The similar wheel at the opposite corner of base 46, which is hidden in FIG. 4A, similarly rides against the back side of control rod wing 26(4).

Wheel 69 is secured to pivoted arm 71 which is actuatable by movement of a latching arm 72 and linkage attached thereto. Outward movement of arm 72 pivots the arm 71 and wheel 69 outwardly. After the carriage 38 is maneuvered into position on the control rod, the arm 72 is moved inward to bring the wheel 69 into contact with and latch it into position against the control rod arm. The arm 72 can be remotely actuated by a pole fitted with a suitable hook. Such tools are well-known and available at nuclear plants for remove actuation purposes.

A suitable latch mechanism for the wheel arrangement 68 is, for example, a KNU-VISE available from Lapeer Manufacturing Company, Detroit, Mich. as catalog No. HLC-600.

It is noted that rubbing pads or buttons, such as a pad 75, formed of a suitable material such as nylon, are removably secured to portions of the enclosures 47 and 48 and to base plate 46 at points where rubbing contact with the control rod may occur.

Further details of the source enclosure 47 now will be discussed. A suitable neutron source 73 is removably contained in the enclosure 47 in a suitable receptode shown in the form of a slanted tube 74 formed of a material having a low neutron capture cross section. A suitable source is manufactured, for example, by the General Electric Company at its Vallecitos Nuclear Center, Pleasanton, Calif. as a sealed source capsule Model GEN-CF-100. This source contains 1–4 mg of Cf-252 and provides a neutron flux of about $2.4 \times 10^9$ n/sec/mg of fast neutrons. The enclosure 47 is filled with water by virtue of slots 76 in a source face plate 77 and a shielded water passage 78. (For some applications the apertured face plate 77 can be omitted, the side of the enclosure 47 adjacent the component under test simply being left open.) Some of the neutrons from source 73 are therefore moderated by the water and pass through the slots 76 into the control rod wing under test. The amount of moderation, and hence the average energy (for a given source strength) of the neutrons passing through the component under test, can be adjusted by varying the distance of the source from the component or the amount of moderator between the source and component.

The source 73 is retained in its proper position in tube 74 by a pair of slideable and lockable keeper members 79(1) and 79(2) the nose ends of which fit into the tube 74 through transverse slots therein on either side of the source 73. The keepers 79(1) and 79(2) are retained in inserted or withdrawn position by a keeper lock mechanism including a flattened shaft 81 actuatable by an arm 82. An elevation view of the keepers 79(1) and 79(2) with the shaft 81 in cross section is shown in FIG. 4B.

The keeper members 79(1) and 79(2) are formed with two spaced holes 83(1) and 83(2) connected by a slot 84. The flattened shaft 81 is shown in hole 83(1), the inserted position of the keeper, and in its locking position. Rotation of the shaft 81, through ninety degrees, by actuation of the arm 82, allows withdrawal of the keeper (by lifting with a remote tool engaging an end hole 85) and movement of the shaft along slot 84 to hole 83(2). Rotating the arm 82 then returns shaft 81 to its sideways position in hole 83(2) to lock the keeper in its withdrawn position. The keeper 79(1) is also formed with an open-ended slot 86 to allow passage of the source cable 58 while blocking movement of the source.

It was mentioned hereinbefore that the source 73 is insertable into and removable from the enclosure 47 by means of the cable 58 attached thereto. Insertion is accomplished by bringing the carriage 38 to the end of the pool and inserting the free end of cable 58 upward through the tube 74. Keeper 79(1) is inserted while keeper 79(2) is maintained in its withdrawn position. The carriage 38 is lowered into the pool to provide shielding and the source 73 is pulled by the cable 58 into position in the tube 74. The keeper 79(2) is then inserted, by remote actuation of it and of arm 82, to lock the source in position. The source 73 is removed simply by withdrawing keeper 79(1) and pulling the source from the tube.

The discussion will now be directed to the detector enclosure 48. The detector enclosure includes a face plate 87 formed with a plurality of spaced neutron collimating apertures or slots 88(1)–88(4) in line with apertures 76 in source face plate 77 and best shown in the elevation view of face plate 87 in FIG. 4C. Behind the slots 88(1)–88(4) are secured respective neutron detectors 89(1)–89(4) for detection of the neutrons transmitted from the source 73 through the control rod wing 26(1).

The slots 88(1)–88(4) are spaced vertically but with their ends in alignment so that scanning of the complete width of the control rod wing 26(1) is achieved with isolated individual neutron detectors. To further detector-to-detector independence, the detectors are isolated from one another in the enclosure 48 by neutron absorbing partitions 90. Individual signal cables from the detectors 89(1)–89(2) are passed through suitable holes in the partitions 90 and collectively exit the enclosure through a top hole to form the cable 49.

Suitable neutron detectors are well-known. Neutron detectors and signal processing circuitry are discussed, for example, by W. J. Price in "Nuclear Radiation Detection," 2nd edition, McGraw-Hill, Inc. 1964. A suitable neutron detector for use in the described system is an in-core fission counter detector No. 112C 3107G5 manufactured by the Nuclear Energy Control and Instrumentation Department of the General Electric Company, Jan Jose, Calif.

A modification of the system of the invention to provide neutron transmission scanning of individual rods, elements or the like, such as fuel rods or control rod absorber rods (such as rod 27 of FIG. 2B) is illustrated in FIG. 5.

The modification comprises an additional or alternate apertured collimating face plate 101 for the detector enclosure 48. The face plate 101 is fitted with apertured upper and lower rod guiding brackets 102(1) and 102(2). Guide apertures 103 in the guide brackets 102(1) and 102(2) are sized to receive therethrough a rod 104 to be tested. The apertures 103 can be made of differing diameters to receive and guide rods of similarly differing diameter. The apertures 103 are positioned to guide the rods to be tested past neutron collimating apertures 106 in the face plate 101 and through the slot 63 in the base plate 46. The apertures 106 may be of a size and shape appropriate for the rod to be tested. The apertures 106 are positioned in alignment with the slots 88(1)–88(4) of the face plate 87 shown in FIG. 4C and hence in alignment with the neutron detectors 89(1)–89(4).

The rod 104 to be tested is remotely held and maneuvered by a grapple 107 which is fitted with a remotely actuatable collet 108 or the like by which an extension 109 of the end plug of rod 104 can be gripped. Such a grapple is a common item of equipment in a nuclear plant.

To perform the scanning operation the rod 104 may be suspended in the pool and the carriage 38 moved therepast similar to the scanning of the control rod 14 described in connection with FIG. 3. However, it may be more convenient to suspend the carriage 38 in the pool, for example, from crane 37, and move the rod 104 through the guide apertures 103 by attachment of the grapple 107 to cable 42 of boom 39 of FIG. 3. While scanning of cylindrical rods is illustrated in FIG. 5, scanning of components of other transverse cross section shape can be accomplished by suitable modification of the shapes of apertures 103 and 106.

Figure 6:
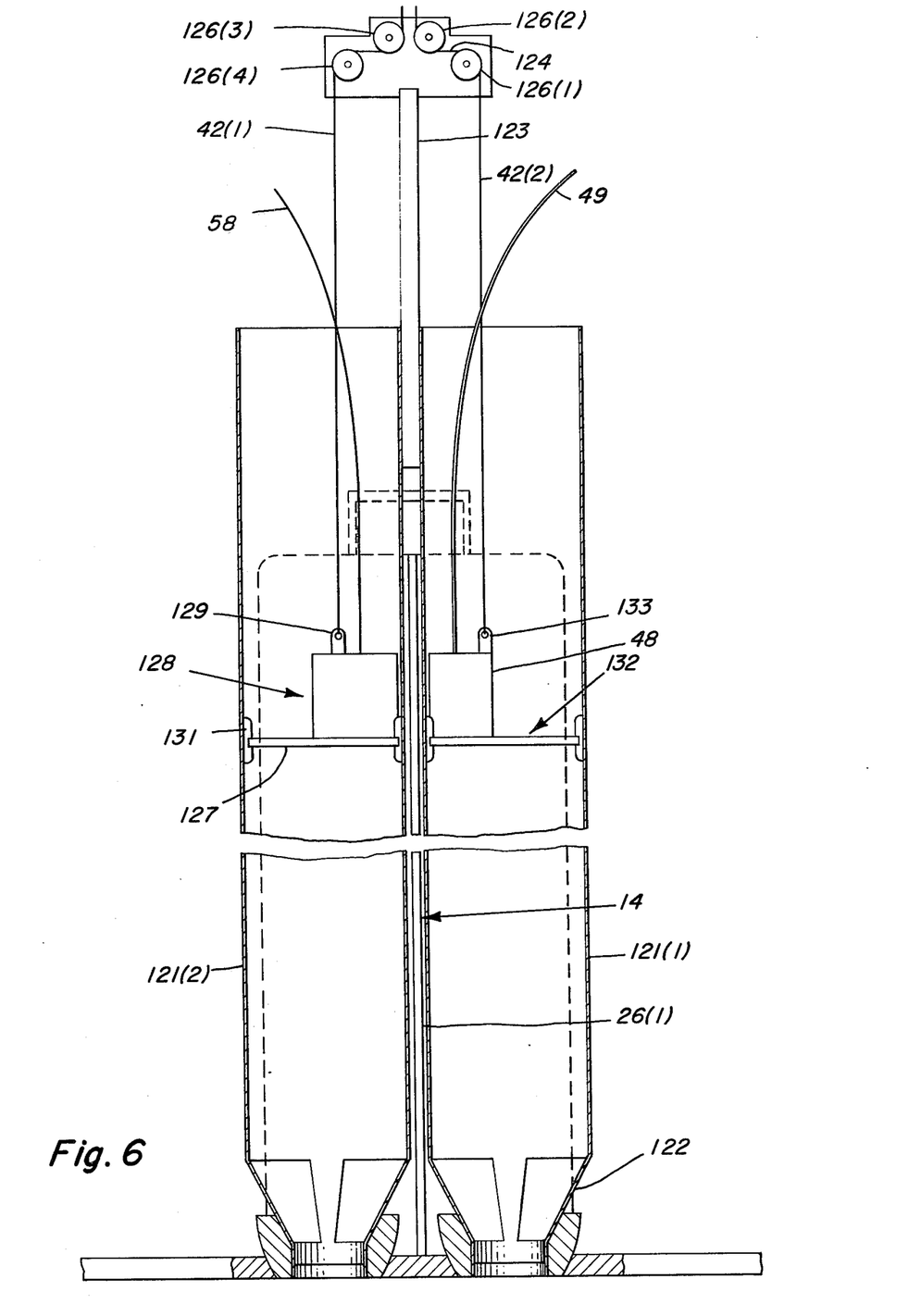
FIG. 6 is an elevation and schematic view of a modified form of the test apparatus of the invention.

Another modification of the system of the invention is illustrated in elevation and schematic view of FIG. 6. The purpose of this modification is to provide scanning of control rod 14 without removing it from the nuclear reactor core.

Referring again to FIG. 1 it will be recalled that a cell of the core is formed by a control rod 14 surrounded by four fuel assemblies 11(1)–11(4). In order to provide access of the wings of the control rod, two adjacent ones of the fuel assemblies must be removed in turn. It will be assumed for purposes of the present discussion that the fuel assemblies 11(3) and 11(4) of FIG. 1 are removed to allow access to wing 26(1) of the control rod 14. As mentioned hereinbefore each of the fuel assemblies comprises an array of fuel elements surrounded by an open ended flow channel 15. When the fuel assemblies 11(3) and 11(4) are removed, they are replaced with a pair of attached and empty or dummy flow channels 121(1) and 121(2) of FIG. 6 to retain the control rod 14 in its proper position. These dummy flow channels are fitted at their bottom ends with nose pieces 122 suitably shaped to fit into the fuel assembly nose piece sockets of the core support structure.

At their upper ends the dummy channels 121(1) and 121(2) are secured to a spacer and support member 123 of thickness appropriate to the spacing of the channels from the control rod wing 26(1). The support member 123 extends upward and supports a cross member 124. Secured for rotation to cross member 124 are a plurality of cable directing pulleys 126(1)–126(4).

For this version and application of the invention, the source enclosure 47 and the detector enclosure 48 are supported and moved on separate carriages within the channels 121(2) and 121(1), respectively. Otherwise construction and operation are similar to that described in connection with FIGS. 3 and 4A. The neutron source enclosure 47 is secured to a carriage base plate 127 of a carriage 128. Extending upward from source enclosure 47, and secured thereto at a point appropriate to the weight distribution thereof, is a lifting eye 129 connected to the yoke end 42(1) of cable 42 (FIG. 3), the cable end 42(1) being threaded under pulley 126(3) and over pulley 126(4). The carriage 128 is fitted at its four corners with suitable guide rollers or slides 129.

The detector enclosure 48 is secured to a similar carriage 132 including a lifting eye 133 connected to yoke end 42(2) of cable 42, the cable end 42(2) being threaded under pulley 126(2) and over 126(1). Thus with this arrangement, actuation of the winch 41 moves the carriages 128 and 132 simultaneously along the opposite sides of the control rod wing 26(1) and provides neutron transmission scanning. It is noted that the dummy channels 121(1) and 121(2) are formed of a material such as zirconium alloy having a low neutron capture cross section and hence low attenuation of the neutrons directed by the source into the control rod wing. It is further noted that the distance between the cross member 124 and the tops of channels 121(1) and 121(2) is sufficient to allow insertion and removal of the carriages 128 and 132 into and from the channels.

Thus what has been described is a method and portable apparatus for remotely performing on-site testing of radioactive components by determining their neutron transmission characteristics.

What is claimed is:

1. A method of determining the neutron transmission characteristics of the wings of a cruciform shaped control rod positioned in a nuclear reactor core wherein each of the four wings of said control rod is normally located between a pair of fuel assemblies, each of said fuel assemblies including a surrounding flow channel, comprising the steps of: (1) removing a pair of said fuel assemblies from said core to provide access to one wing of said control rod; (2) positioning a neutron shielding source enclosure containing a neutron source on one side of said one wing, a side of said source enclosure being adjacent said one wing and having an opening therein for passage of a continuous stream of neutrons into said one wing from said source; (3) positioning a neutron shielding detector enclosure containing neutron detector means on the opposite side of said one wing, a side of said detector enclosure being adjacent said one wing and having at least one opening for passage of neutrons from said one wing to said detector means for detection of neutrons that pass through said one wing from said source; (4) monitoring the signals from said detector means to determine the relative number of neutrons transmitted from said source through said one wing to said detector means; and (5) moving said source and detector enclosures in unison along the length of said one wing and registering a record of the signals from said detector means during said moving.

2. The method of claim 1 including the steps of placing dummy flow channels in the positions of said removed fuel assemblies and positioning said source and detector means enclosures within respective ones of said dummy flow channels.

3. The method of claim 1 including the further steps of generating a position signal indicative of the position of said source and detector enclosures along the length of said control rod and recording a record of said position signal.

4. Portable apparatus for remotely determining the neutron transmission characteristics of a control rod located in a pool of water for shielding operating personnel from radiation comprising: a neutron source removably contained in a shielding cask in said pool; a carriage positioned adjacent said control rod and adapted for movement therealong; a neutron source enclosure formed of a neutron shielding material and supported on said carriage adjacent one side of said control rod, said enclosure containing a receptacle for receiving said neutron source, said enclosure having at least one opening for passage of neutrons in the side of said enclosure adjacent said control rod; remotely manipulatable means for moving said neutron source from said cask into said receptacle in said enclosure whereby a continuous stream of neutrons from said source is directed through said opening into said control rod; neutron detection means supported on said carriage adjacent a side of said control rod opposite from said one side for detecting neutrons transmitted through said control rod from said source whereby signals produced by said detection means are proportional to the quantity of neutrons transmitted from said source through said control rod; remotely manipulatable means for moving said carriage along the length of said control rod; and recording means responsive to the signals from said neutron detection means for registering said signals as said carriage is moved along the length of said control rod.

5. Apparatus according to claim 4 further including position indicating means coupled to said moving means and responsive to said movement to produce a position signal indicative of the position of said neutron detector means with respect to the distance along the length of said control rod and means for recording said position signal in synchronism with the recording of the signals from said detector means.

6. Apparatus according to claim 4 wherein said detector means includes a neutron shielding enclosure.

7. Apparatus according to claim 4 including guiding means for guiding said carriage means along said control rod.

* * * * *